(12) United States Patent
Van Putten et al.

(10) Patent No.: US 9,669,568 B2
(45) Date of Patent: Jun. 6, 2017

(54) THREE-DIMENSIONALLY SHAPED ARTICLES AND PROCESS FOR PRODUCING THE SAME

(75) Inventors: Koen Van Putten, Amstenrade (NL); Roelof Marissen, Born (NL)

(73) Assignee: DSM IP ASSETS B.V., Heerlen (NL)

( * ) Notice: Subject to any disclaimer, the term of this patent is extended or adjusted under 35 U.S.C. 154(b) by 786 days.

(21) Appl. No.: 13/133,270

(22) PCT Filed: Dec. 17, 2009

(86) PCT No.: PCT/EP2009/067369
§ 371 (c)(1),
(2), (4) Date: Aug. 29, 2011

(87) PCT Pub. No.: WO2010/070027
PCT Pub. Date: Jun. 24, 2010

(65) Prior Publication Data
US 2011/0300328 A1 Dec. 8, 2011

(30) Foreign Application Priority Data
Dec. 18, 2008 (EP) .................................... 08021998

(51) Int. Cl.
| | | |
|---|---|---|
| *B32B 27/12* | (2006.01) | |
| *B29C 43/14* | (2006.01) | |
| *B29C 43/20* | (2006.01) | |
| *B29C 53/04* | (2006.01) | |
| *F41H 5/04* | (2006.01) | |
| *B29C 67/00* | (2017.01) | |
| *B29K 23/00* | (2006.01) | |
| *B29K 105/06* | (2006.01) | |

(52) U.S. Cl.
CPC ............ *B29C 43/14* (2013.01); *B29C 43/203* (2013.01); *B29C 53/04* (2013.01); *F41H 5/0485* (2013.01); *B29C 67/0029* (2013.01); *B29K 2023/0683* (2013.01); *B29K 2105/06* (2013.01); *B29K 2223/0683* (2013.01); *B29K 2995/0089* (2013.01); *Y10T 428/24* (2015.01)

(58) Field of Classification Search
CPC ......... B29C 43/24; B29C 53/04; B29C 53/02; B29C 67/0029; B29C 61/10
USPC ...................... 264/257, 258, 119, 120, 288.4
See application file for complete search history.

(56) References Cited

U.S. PATENT DOCUMENTS

| | | | | |
|---|---|---|---|---|
| 4,386,926 | A | * | 6/1983 | Heller ..................... B29C 53/06 229/930 |
| 4,792,427 | A | | 12/1988 | Reeves |
| 4,985,195 | A | | 1/1991 | Wilson et al. |
| 5,028,663 | A | | 7/1991 | Chung |
| 5,124,195 | A | * | 6/1992 | Harpell et al. ................. 428/152 |
| 5,407,623 | A | * | 4/1995 | Zachariades ......... A61C 15/041 264/119 |
| 5,677,029 | A | * | 10/1997 | Prevorsek ................. B32B 5/12 428/105 |
| 5,788,907 | A | * | 8/1998 | Brown, Jr. .............. B29C 70/22 264/175 |
| 2006/0210749 | A1 | * | 9/2006 | Geva et al. ................... 428/36.1 |
| 2008/0254281 | A1 | * | 10/2008 | Chen ..................... B29C 51/004 428/335 |

FOREIGN PATENT DOCUMENTS

| | | |
|---|---|---|
| EP | 1 537 977 | 6/2005 |
| EP | 1 627 719 | 2/2006 |
| EP | 1 796 210 | 6/2007 |
| FR | 2 018 697 | 6/1970 |
| WO | WO 2007/122009 | 11/2007 |
| WO | WO 2007122009 A1 * | 11/2007 |

OTHER PUBLICATIONS

Walker et al., U.S. Appl. No. 60/718,025, filed Sep. 16, 2005.*
International Search Report for PCT/EP2009/067369, dated Apr. 19, 2010.
Offringa A R: "Thermoplastic Composites—Rapid Processing Applications", *Haywards Heath*, vol. 27A, No. 4, Apr. 1, 1996, pp. 329-336.

* cited by examiner

*Primary Examiner* — Galen Hauth
(74) *Attorney, Agent, or Firm* — Nixon & Vanderhye P.C.

(57) ABSTRACT

Process for producing a three-dimensionally shaped article, comprising the steps a) providing a structure containing a plurality of consolidated films or tapes of uni-directionally oriented polymer, b) forming the structure into a three-dimensionally shaped article by applying a force at a temperature below the melting point of the oriented polymer.

15 Claims, No Drawings

THREE-DIMENSIONALLY SHAPED ARTICLES AND PROCESS FOR PRODUCING THE SAME

This application is the U.S. national phase of International Application No. PCT/EP2009/067369 filed 17 Dec. 2009 which designated the U.S. and claims priority to EP Patent Application No. 08021998.3 filed 18 Dec. 2008, the entire contents of each of which are hereby incorporated by reference.

The invention relates to a process for producing a three-dimensionally shaped article, the article preferably containing a consolidated plurality of mono-layers or bi-layered structures comprising films or tapes of a polymer, preferably of an unidirectionally oriented polymer. The invention also relates to three-dimensionally shaped articles obtainable by the process.

Such a process and such articles are known for example from EP-A-1627719. This patent application describes a structure comprising a plurality of unidirectionally oriented mono-layers consisting essentially of ultrahigh molecular weight polyethylene (UHMwPE) and essentially devoid of bonding matrices, with the direction of each mono-layer being rotated at an angle with respect to the direction in an adjacent unidirectional mono-layer. The structures are produced in different steps as described below:

In a first step the mono-layers are produced by aligning a plurality of unidirectional UHMwPE tapes in the same direction wherein adjacent tapes partially overlap and subsequently pressing the tapes together, at increased temperature for a period of time, to obtain the mono-layer.

After that a bi-layered structure is produced in a second step by placing a plurality of tapes on top of the mono-layer, in the same fashion as described for the mono-layer above, however in a different direction of orientation and subsequently pressing the tapes and the mono-layer together, at increased temperature for a period of time, to form a consolidated bi-layered structure.

Finally, in a third step a plurality of bi-layered structures are stacked and pressed at increased temperature together for a period of time to consolidate said plurality and to form a shaped article, containing consolidated mono-layers.

The formed shaped article may be flat or contoured. Shaped articles thus obtained are suitable for use as anti-ballistic articles, to give protection against bullets, but it is also resistant against the stabbing of knifes or other sharp objects. The shaped articles may therefore be used for example as inserts in bullet proof vests, but also as covering for running engines etc.

However, producing a contoured article by stacking bi-layered structures and pressing together the bi-layered structures into a contoured or three-dimensionally shaped article is troublesome.

During the third step mentioned hereinabove, i.e. the step wherein the bi-layered structures are pressed and consolidated under temperature, said bi-layered structures slide in an uncontrolled way along each other and folds and wrinkles are formed in the bi-layered structures that give rise to weak spots in the final three-dimensionally shaped article. This is especially true if the three-dimensionally shaped article deviates largely from a flat, 2-dimensional structure. Also the molds for forming the three-dimensional products in this way are complicated and thus costly.

The object of the invention is to provide a process for producing the three-dimensionally shaped articles without these disadvantages or having these disadvantages to a lower extent.

Surprisingly this is achieved by providing a process for producing a three-dimensionally shaped article, comprising the steps:
a) providing a structure containing a consolidated plurality of mono-layers or of bi-layered structures, said mono-layers or said bi-layered structures containing polymeric fibers or polymeric films or polymeric tapes or a combination thereof, preferably said mono-layers or said bi-layered structures containing films or tapes of an unidirectionally oriented polymer; and
b) forming the structure into a three-dimensionally shaped article by applying a force at a temperature below the melting point of the polymer contained by said fibers, films or tapes.

By a consolidated plurality of mono-layers or a consolidated plurality of bi-layered structures is herein understood that said mono-layers or said bi-layered structures are stacked and pressed together at increased temperature for a period of time. After being consolidated, mono-layers or bi-layered structures in the consolidated stack cannot freely slide one in respect of an adjacent another, preferably the abutting surfaces of two adjacent mono-layers or bi-layered structures being connected to one another in their entirety. By plurality is herein understood that the number of said mono-layers or bi-layered structures is sufficient to provide the stack containing thereof preferably with stab resistance and/or anti ballistic properties. Preferably at least 4, more preferably at least 50, most preferably at least 100 mono-layers or bi-layered structures are used to achieve a good stab and/or ballistic resistance. The upper limit for the number of mono-layers or bi-layered structures is only dictated by practicality, e.g. the aimed thickness of the final product, and is preferably at most 100.000 for products aimed to resist an impact from fast projectiles, preferably at most 10.000 for products aimed to resist an impact from conventional threats.

The structures provided in step a) of the process are readily formed, also known as pre-formed structures, resulting in structures or products having well defined dimensions and homogeneous properties. Such structures include e.g. panels and consolidated plaques.

Surprisingly, in step b), the consolidation of the fibers, films or tapes is well maintained after forming of the three dimensional shaped article, even in areas of large deformation.

In step b) it furthermore is not necessary to use complicated molds, but for example simple bending equipment or the like may be used.

The mono-layers used in the process of the invention preferably contain a plurality of polymeric fibers, polymeric tapes or a polymeric film. In the case of a mono-layer containing a plurality of polymeric fibers, said fibers may be arranged in a unidirectional fashion, i.e. the majority of the fibers, i.e. at least 90% of all fibers, preferably all fibers, run in a common direction. Such mono-layers provide structures containing thereof with good anti-ballistic properties. Alternatively, the polymeric fibers in a mono-layer can be woven, knitted or non-woven, e.g. felt like. In case of a mono-layer containing a plurality of polymeric tapes, said tapes are preferably woven to form a tape-woven mono-layer, more preferably said tapes are woven to form a plain weave. Such a tape-woven mono-layer has good form stability being easily handled. In another embodiment of a mono-layer containing polymeric tapes, said tapes are arranged in a unidirectional fashion, i.e. at least 90% of all tapes, preferably all tapes, run in a common direction wherein said tapes are abutting or overlapping with each other along their common running direction. When said tapes are overlapping, the area of overlap is preferably at least 0.1% of the narrowest tape's surface, more preferably at least 0.5%, most preferably at least 1%. Preferably, said area of overlap is at most 5% of the narrowest tape's surface, more preferably at most 3%, most preferably at most 2%.

In the films or tapes it is possible to use as the polymer, a polymer selected from the group consisting of polyolefins, polyesters, polyvinyl alcohols, polyacrylonitriles, polyamides, especially poly(p-phenylene teraphthalamide), liquid crystalline polymers and ladder-like polymers, such as polybenzimidazole or polybenzoxazole, especially poly(1, 4-phenylene-2,6-benzobisoxazole), or poly(2,6-diimidazo [4,5-b-4',5'-e]pyridinylene-1,4-(2,5-dihydroxy)phenylene). Also copolymers containing monomers of above-defined polymers may be used. Very good results are obtained if crystalline or semi-crystalline polymers are used, especially polyolefins, polyesters, polyvinyl alcohols, polyacrylonitriles and polyamides. Preferably the polyolefin is a polyethylene. Most preferably ultra high molecular weight polyethylene (UHMwPE) is used, because in this way three-dimensionally shaped articles are obtained that have very good anti-ballistic properties, while the process according to the invention runs smooth. The ultra high molecular weight polyethylene may be linear or branched, although preferably linear polyethylene is used. Linear polyethylene is herein understood to mean polyethylene with less than 1 side chain per 100 carbon atoms, and preferably with less than 1 side chain per 300 carbon atoms; a side chain or branch generally containing at least 10 carbon atoms. Side chains may suitably be measured by FTIR on a 2 mm thick compression molded film, as mentioned in e.g. EP 0269151. The linear polyethylene may further contain up to 5 mol % of one or more other alkenes that are copolymerisable therewith, such as propene, butene, pentene, 4-methylpentene, octene. Preferably, the linear polyethylene is of high molar mass with an intrinsic viscosity (IV, as determined on solutions in decalin at 135° C.) of at least 4 dl/g; more preferably of at least 8 dl/g, most preferably of at least 10 dl/g. Such polyethylene is also referred to as ultra high molecular weight polyethylene. Intrinsic viscosity is a measure for molecular weight that can more easily be determined than actual molar mass parameters like Mn and Mw.

To produce polymeric fibers the same polymer as those presented above may be used. The skilled person knows how to obtain fibers from the above mentioned polymers. Examples of widely known processes include melt spinning and gel spinning of polymers into fibers. Such processes also include drawing said fibers after being spun in order to form high strength fibers, i.e. fibers having a strength of at least 0.5 GPa as measured by ASTM D2256-02(2008). Such high strength fibers impart structures containing thereof with good stab-resistance and/or anti ballistic properties.

Tapes or films of above mentioned polymers may be produced by feeding the polymer to an extruder, extruding a tape or a film at a temperature above the melting point thereof and drawing the extruded polymer tape or film. If desired, prior to feeding the polymer to the extruder, the polymer may be mixed with a suitable liquid organic compound, for instance to form a gel, such as is preferably the case when using UHMwPE.

A preferred process for the formation of such films or tapes in case UHMwPE is used comprises agglomeration of an UHMwPE powder into a film or tape, followed by drawing. It is for example possible to feed the UHMwPE powder between a combination of endless belts, compression-moulding the polymeric powder at a temperature below the melting point thereof and rolling the resultant compression-moulded polymer followed by drawing. Such a process is for instance described in U.S. Pat. No. 5,031,133A, which is incorporated herein by reference. Such UHMWPE should be drawable in the solid state, e.g. as described in U.S. Pat. No. 5,773,547. Drawing of the produced tapes or films may be carried out by means known in the art.

Such means comprise extrusion stretching and tensile stretching on suitable drawing units. Drawing may take place in two directions, however with a higher drawing rate in one of the directions, to obtain orientation of the polymer in that direction. Preferably drawing is carried out in one direction as so-called uniaxial drawing, such uniaxial drawing producing tapes or films containing an unidirectionally oriented polymer. To attain increased mechanical strength and stiffness, drawing may be carried out in multiple steps. In case of the preferred ultra high molecular weight polyethylene tapes or films, drawing is typically carried out axially in a number of drawing steps. The first drawing step may for instance comprise drawing to a stretch factor of 3. Multiple drawing may typically result in a stretch factor of 9 for drawing temperatures up to 120° C., a stretch factor of 25 for drawing temperatures up to 140° C., and a stretch factor of 50 for drawing temperatures up to and above 150° C. By multiple drawing at increasing temperatures, stretch factors of about 50 and more may be reached. This results in high strength tapes or films, whereby for tapes of ultra high molecular weight polyethylene, strengths of 1.5 GPa to 1.8 GPa and more may be obtained.

Tapes may be produced by cutting or splitting a drawn film along the direction of drawing, or may be directly obtained from the processes described above. Preferably a film is produced of limited width and drawn. During this drawing process the width of the film decrease, so that finally a tape is obtained. The product is indicated to be a tape, if the width is less that 450 mm. Preferably the tape has a width of between 10 and 400 mm, more preferably between 20 and 350 mm, even more preferably between 25 and 250 mm.

The areal density of the final films and tapes used to produce the mono-layers may be varied over a large range, for instance between 5 and 200 $g/m^2$. Preferred areal density is between 10 and 120 $g/m^2$, more preferred between 15 and 80 $g/m^2$ and most preferred between 20 and 60 $g/m^2$.

The structure containing a consolidated plurality of films or tapes may be produced by making a stack of the films or tapes and compressing this stack together, at a temperature below the melting point of the oriented polymer, or by producing in a first step mono-layers or bi-layers containing films or tapes and consolidating the mono-layers or bi-layers in a second step into the structure, such as a panel.

Mono-layers and bi-layers may be produced according to various processes. According to one of the processes as disclosed in EP-A-1 627 719 a plurality of unidirectional tapes is aligned such that each tape is aligned in the same direction, wherein adjacent tapes may partially overlap, and compressing said plurality of unidirectional tapes at a certain pressure, at increased temperature, for a certain period of time, thereby forming a unidirectional mono-layer, also known as a consolidated unidirectional mono-layer. Preferably two of such mono-layers are placed on top of each other the direction of orientation of one mono-layer being rotated with respect to the other mono-layer at an angle, preferably at an angle of 90 degrees and pressed together under the same conditions, to form a bi-layered structure, also known as a consolidated bi-layered structure.

According to another process as disclosed in EP-A-1 627 719 in a first step a monolayer as defined above is provided, in a second step a plurality of unidirectional tapes is aligned such that each tape is aligned in the same direction, wherein adjacent tapes partially overlap, said plurality of tapes is laid over the monolayer provided in the first step, wherein the direction of orientation of said plurality of tapes provided in the second step is rotated at an angle, preferably at an angle of 90 degrees with respect to the direction of orientation of the monolayer provided in the first step. After that the plurality of tapes are compressed together with the monolayer at a certain pressure, at increased temperature, for a certain period of time, to form a consolidated bi-layered structure.

Preferably above processes are carried out without placing adjacent tapes in overlap. In this way the ballistic properties of the final 3-dimensionally shaped articles have been improved. This causes the mono-layers to be of uniform thickness. In order to consolidate mono-layers, adjacent tapes may be glued together by a binder. Suitable binders are described in e.g. Suitable binders are described in e.g. EP 0191306 B1, EP 1170925 A1, EP 0683374 B1 and EP 1144740 A1. The binder may be applied in various forms and ways; for example as a transverse bonding tape (transverse with respect to the unidirectional tapes), as at least partially coating of the tapes or as a polymeric carrier. The application of the binder during the formation of the monolayer advantageously stabilizes the tapes, thus enabling faster production cycles to be achieved while avoiding overlaps between adjacent tapes.

Preferably as little binder as possible is used. In this way the final article combines high anti-ballistic protection and a low weight. Furthermore very good results are obtained with the process of the invention. Large deformations are possible, while maintaining the consolidation of the monolayers in the article. Good results are obtained, if the structure provided in step a) contains less than 10 wt. % of binder, more preferably less than 5 wt. %, even more preferably less than 2 wt. %. Most preferably the structure contains no binder. This is for example possible if an alternative binding means is used, such as ultrasonic welding may be used adjoining longitudinal edges of adjacent tapes. In another preferred embodiment a monolayer is built up of a plurality of unidirectional tapes of the drawn polymer, aligned such that they form a woven structure. Such monolayers may be manufactured by applying textile techniques, such as weaving, braiding, etc. of the tapes of drawn polymer, instead of on fibers, which is usually done. A three-dimensionally shaped article according to the invention shows very favorable anti-ballistic properties.

Mono-layers or bi-layered structures containing fibers may also contain a binder. In particular for mono-layers or bi-layered structures containing fibers, good results were obtained when the content of the binder is below 15 wt %, more preferably below 10 wt %, more preferably below 5 wt %, most preferably, said mono-layers or bi-layered structures being free of binder.

For further ways of producing mono-layers and bi-layers containing tapes without overlap, it is referred herein to WO2007/122009.

The consolidation of tapes into mono-layers and bi-layers may take place at elevated temperature, preferably 2 to 40° C. below the melting point of the polymer, more preferably 5-30° C. below the melting point of the polymer.

In case of UHMwPE tapes, consolidation may take place at temperatures, pressures and periods of time as indicated in EP-A-1 627 719, the disclosure of which is included herein by reference. Good results are obtained at temperatures between 100 and 150° C. under a pressure of between 10 and 100 N/cm$^2$. The period of time to apply these conditions can easily be determined by the skilled person and may vary between a few seconds until a few minutes, will increase with the thickness of the tapes, and will decrease with increasing temperature and increasing pressure.

The structure containing the plurality of consolidated mono-layers containing one or more films or tapes of the unidirectionally oriented polymer preferably contains at least 4 unidirectional monolayers, preferably at least 8 unidirectional monolayers, more preferably at least 16 unidirectional monolayers, even more preferably at least 32 unidirectional monolayers. Increasing the number of unidirectional monolayers in the multilayer material sheet of the invention provides a more robust and more ballistic resistant three-dimensionally shaped article. In that respect a preferred thickness of the three-dimensionally shaped article according to the invention ranges from 3 to 75 mm, more preferably from 5 to 50 mm.

The structure being a consolidated structure, and may e.g. be prepared by compressing the plurality of consolidated films or tapes of unidirectionally oriented polymer. Such processes for producing the structures are described for example in EP-1627719. In principle stacks of the monolayers or bi-layers are formed and consolidated into the structure. Further embodiments of the process are described in WO2007/122009. Consolidation of the mono-layers or bi-layers into the structure containing the plurality of consolidated mono-layers containing one or more films or tapes of the unidirectionally oriented polymer may suitably be done in a hydraulic press. Consolidation is intended to mean that the monolayers are relatively firmly attached to one another to form one unit. The temperature during consolidating generally is controlled through the temperature of the press. A minimum temperature generally is chosen such that a reasonable speed of consolidation is obtained. In this respect 80° C. is a suitable lower temperature limit, preferably this lower limit is at least 100° C., more preferably at least 120° C., most preferably at least 140° C. A maximum temperature is chosen below the temperature at which the drawn polymer monolayers lose their high mechanical properties due to e.g. melting. Preferably the temperature is at least 2° C., preferably at least 5° C. and even more at least 10° C. below the melting temperature of the drawn polymer monolayer. In case the drawn polymer monolayer does not exhibit a clear melting temperature, the temperature at which the drawn polymer monolayer starts to lose its mechanical properties should be read instead of melting temperature. In the case of the preferred ultra high molecular weight polyethylene, a temperature below 145° C. generally will be chosen. The pressure during consolidating preferably is at least 7 MPa, more preferably at least 15 MPa, even more preferably at least 20 MPa and most preferably at least 35 MPa. In this way a stiff antiballistic article is obtained. The optimum time for consolidation generally ranges from 5 to 120 minutes, depending on conditions such as temperature, pressure and part thickness and can be verified through routine experimentation.

Preferably, in order to attain a high ballistic resistance, cooling after compression moulding at high temperature is carried out under pressure as well. Pressure is preferably maintained at least until the temperature is sufficiently low to prevent relaxation. This temperature can be established by one skilled in the art.

Although not preferred it is possible that the structure provided in step a) already has a three-dimensional structure. It is for example possible that the structure is curved in one direction or that it only slightly deviates from a 2-dimensional structure. Preferably the structure provided in step a) is a flat panel, the panel containing a consolidated plurality of mono-layers or bi-layered structures containing preferably films or tapes. Such flat panels may easily be produced, from stacks of bi-layers or even mono-layers, by using simple flat molds, without any folds or wrinkles in films and tapes or in the mono-layers or the bi-layers if these are used to make the structure.

It is possible that the forming of step b) is carried out at a temperature starting from room temperature up to some degrees below the melting temperature of the polymer. Preferably the temperature in step b) is room temperature. At this temperature forming may take place easily, without the necessity of taking extra measures of heating the structure.

It is possible that in step b) the three-dimensionally shaped article is formed in one single step, wherein a force is applied at a temperature below the melting point of the oriented polymer of the mono-layers. It is also possible that forming of the structure as provided in step a) takes place in two or more sub-steps in step b) In that case in each step part of the formation takes place, to finally obtain the desired shape of the three-dimensionally shaped article after the total of the steps. This procedure may be followed in case completed designs have to be obtained or in case the three-dimensionally shaped article largely deviates from a 2-dimensional shape. Than in each step relatively simple molds may be used for the shaping of the article. It is also possible that the structure provided in step a) has been shaped into a pre-form. The shape of the pre-form preferably corresponds with the shape of the final three-dimensionally shaped article, so that no or only a limited quantity of excess material needs to be machined off, to obtain the exact finally desired shape. The preform may easily be cut, die-cut or in any other way be machined out of a flat panel. Good examples of ways of forming in step b) are folding or bending.

Equipment for running the process of step b) is known from metal industry for cold forming of metal. It is for example possible to fold a flat panel by using a hinged bender, a folding support etc. It is also possible to bend a panel by rolling it ones or several times over a three roll mil.

The folding line often will be a straight line. However more complicated folding is possible. For example an article may contain a curved folding line or even several folding lines, crossing each other or intersecting folding lines as well.

The invention also relates to three-dimensionally shaped articles obtainable by the process according to the present invention.

Good examples of applications of such three-dimensionally shaped articles are panels for the production of armored vehicles. It is possible to produce a vehicle without the need of using heavy and complicated metal frames for supporting the panels, as the panels have a high global stiffness themselves, because of their three-dimensional structure.

The invention also relates to the use of the three-dimensionally shaped articles obtainable by the process according to the present invention as a radome. The invention further relates to a radome for enclosing and protecting a radar antenna, particularly the type carried by aircrafts, said radome comprising the three-dimensionally shaped article obtainable by the process according to the present invention. By radome is herein understood any structure used to protect electromagnetic radiation equipment, e.g. radar equipment, for e.g. aircraft, ground or ship based. In case that the radome is aircraft based, the radome can be shaped and positioned as the nose of the aircraft, a portion of the wing or fuselage or the tail of the aircraft. The advantage of the radome of the invention is that is has an improved distribution of stiffness. A further advantage may be that the radome of the invention has a good E-field distribution.

A further important advantage of the inventive radome is that said radome has a lighter weight, especially when gel spun fibers of ultrahigh molecular weight polyethylene are used thereof, than known radomes with similar constructions while having improved structural and/or electromagnetic functions. It was surprisingly discovered that the inventive radome it is not tuned to a narrow frequency band as compared to known radomes. Yet a further important advantage of the inventive radome is that it has an increased resistance against projectiles, e.g. in case of military aircrafts, as well as against bird strikes, hail and the like.

Test Methods as Referred to in the Present Application, are as Follows
- Intrinsic Viscosity (IV) is determined according to method PTC-179 (Hercules Inc. Rev. Apr. 29, 1982) at 135° C. in decalin, the dissolution time being 16 hours, with DBPC as anti-oxidant in an amount of 2 g/l solution, by extrapolating the viscosity as measured at different concentrations to zero concentration;
- The melting point of a polymer is determined by DSC on a power-compensation Perkin Elmer DSC-7 instrument which is calibrated with indium and tin with a heating rate of 10° C./min. For calibration (two point temperature calibration) of the DSC-7 instrument about 5 mg of indium and about 5 mg of tin are used, both weighed in at least two decimal places. Indium is used for both temperature and heat flow calibration; tin is used for temperature calibration only.

The invention will now be further elucidated with the following example and comparative experiment, without however being limited hereto.

EXAMPLE

Tapes of UHMwPE having a width of 50 mm and a thickness of 40 μm were produced by the agglomeration and compacting of UHMwPE powder, the UHMwPE having an IV of 22 dl/g into films at a temperature of 135° C., followed by rolling at 140° C., while reducing the thickness to 25%, after which the films were drawn 35 times to be transferred into the tapes.

Mono-layers were produced by weaving of the tapes in a plain weave manner. A stack of 40 of the woven mono-layers consolidated at 135° C. for 60 min at a pressure of 100 bar into a flat panel, having an areal density of just below 4 kg/m$^2$. The panel was folded at 20° C. over an angle of 90° C. at a radius of 5 times the thickness of the panel measured at the location where the radius was smallest. Folding was carried out by using 3-points bending equipment. After folding the consolidation of the mono-layers of the three-dimensionally shaped structure was well preserved. No delamination was seen.

Comparative Experiment A

The same procedure was followed as in the example, however with the difference that the stack of mono-layers was placed in a mold for a 3-dimensionally shaped article containing the fold, and the article containing the angle of 90° was produced in the mold 135° C. for 60 min at a pressure of 100 bar. Handling of the stack of loose mono-layers and placing it in the mold was troublesome and layers tended to shift in position with respect to each other. Furthermore a complicated and expensive mould had to be used.

Comparative Experiment B

The same procedure was followed as in the example, however as mono-layers layers Dyneema® HB2 (DSM Dyneema, the Netherlands) was used, to form a panel having an areal density of about 4 kg/m$^2$. The Dyneema® HB2 contains about 80 wt. % of UHMwPE fibers and about 20 wt. % of matrix polymer. During bending in step b) buckling and delamination between the fiber layers was observed already after slight bending, followed by extensive delamination after further bending.

The invention claimed is:

1. A process for producing a three-dimensionally shaped article, comprising the steps:
    a) providing a consolidated structure containing a consolidated plurality of mono-layers or of bi-layered structures, wherein the mono-layers or bi-layered structures contain polymeric fibers and/or polymeric tapes, wherein the consolidated plurality of mono-layers or consolidated plurality of bi-layered structures contains at least 4 monolayers or bi-layered structures, and wherein the polymeric fibers and/or tapes are woven in a mono-layer; and
    b) forming the consolidated structure into a three-dimensionally shaped article by folding or bending the consolidated structure so as to apply a force to the consolidated structure at a temperature below the melting point of the polymer contained by the polymeric fibers and/or polymeric tapes.

2. The process according to claim 1, wherein the polymeric fibers and/or polymeric tapes are formed of an ultrahigh molecular weight polyethylene (UHMwPE).

3. The process according to claim 2, wherein the mono-layers or bi-layered structures contain polymeric tapes obtained by agglomeration of UHMwPE as a polymer powder into a tape, followed by drawing the tape.

4. The process according to claim 1, wherein the structure provided in step a) contains less than 10 wt. % of a binder.

5. The process according to claim 4, wherein the structure provided in step a) contains no binder.

6. The process according to claim 1, wherein the structure provided in step a) is a flat panel.

7. The process according to claim 1, wherein the forming step b) is carried out at room temperature.

8. The process according to claim 1, wherein the forming step b) is a folding step.

9. The process according to claim 1, wherein the mono-layers or bi-layered structures contain tapes of a unidirectionally oriented polymer.

10. The process according to claim 9, wherein the unidirectionally oriented polymer is ultrahigh molecular weight polyethylene (UHMwPE).

11. The process according to claim 10, wherein the structure provided in step a) contains less than 10 wt. % of a binder.

12. The process according to claim 11, wherein the structure provided in step a) contains no binder.

13. A process for producing a three-dimensionally shaped article, comprising the steps:
    a) providing a consolidated structure comprised of at least four mono-layers or bi-layers of consolidated woven ultrahigh molecular weight polyethylene (UHMwPE) tapes; and
    b) forming the consolidated structure into a three-dimensionally shaped article by folding or bending the consolidated structure about at least one fold line so as to apply a force to the consolidated structure at a temperature below the melting point of the woven UHMwPE tapes.

14. The process according to claim 13, wherein the UHMwPE tapes are formed by agglomeration of UHMwPE powder to form a film, and subsequently reducing the thickness of the films to form the tapes.

15. The process according to claim 13, wherein the UHMwPE tapes of the mono-layer or each layer of the bi-layer are unidirectionally arranged with adjacent tapes overlapping one another.

* * * * *